United States Patent

Iwase

[11] Patent Number: 5,103,737
[45] Date of Patent: Apr. 14, 1992

[54] GARMENT TRANSFER APPARATUS
[75] Inventor: Hideo Iwase, Tokyo, Japan
[73] Assignee: Japan Steel Co., Ltd., Tokyo, Japan
[21] Appl. No.: 572,008
[22] Filed: Aug. 23, 1990
[30] Foreign Application Priority Data Aug. 24, 1989 [JP] Japan .................................. 1-218216
Aug. 24, 1989 [JP] Japan .................................. 1-218217
Aug. 24, 1989 [JP] Japan .................................. 1-218218

[51] Int. Cl.5 ............................................. B61B 13/00
[52] U.S. Cl. ...................................... 104/88; 198/360; 104/89
[58] Field of Search ...................... 104/111, 88, 89, 93, 104/131; 198/360, 370, 735.3, 465.4

[56] References Cited

U.S. PATENT DOCUMENTS

| | | | |
|---|---|---|---|
| 2,946,427 | 7/1960 | Friedman | 104/88 |
| 3,610,159 | 10/1971 | Frickencher | 104/88 |
| 4,597,495 | 7/1986 | Knosby | 104/88 |
| 4,726,299 | 2/1988 | Anderson | 104/88 |
| 4,807,536 | 2/1987 | Llaneza | 104/88 |
| 4,953,469 | 9/1990 | Kuchta et al. | 104/88 |
| 4,977,996 | 12/1990 | Duce | 198/360 |

FOREIGN PATENT DOCUMENTS 2220902 1/1990 United Kingdom ................ 198/360

Primary Examiner—Robert J. Oberleitner
Assistant Examiner—Mark T. Le
Attorney, Agent, or Firm—Kane, Dalsimer, Sullivan, Kurucz, Levy, Eisele and Richard

[57] ABSTRACT

The present invention is an apparatus for transferring items such as garments. Each item has associated with it an information code describing the location to which the item is to be sent, as well as other information. The invention uses a main track to transport the items while the items are hanging, and to store and retrieve the items from one of a number of diverging tracks.

6 Claims, 10 Drawing Sheets

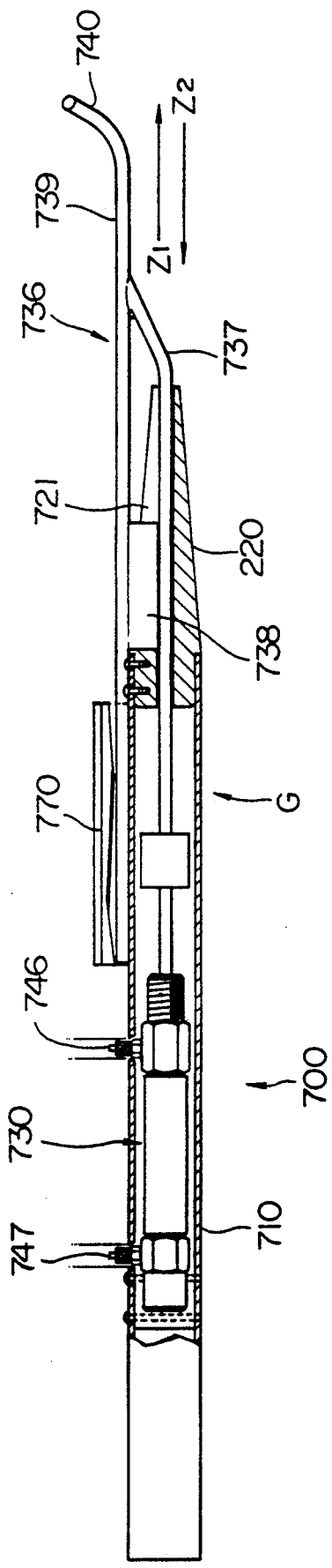

GARMENT TRANSFER APPARATUS

BACKGROUND OF THE INVENTION

The present invention relates to apparatuses for transferring items, and more particularly relates to the transfer of items which may be hung, such as garments and other clothing-related items. Garment-transfer apparatuses are often used in cleaning establishments and other garment-handling establishments where specific items must be retrieved. The apparatus of the present invention relates in particular to an apparatus for high-speed storage and retrieval of items at, for example, a cleaning establishment.

SUMMARY OF THE INVENTION

The present invention is an apparatus which transfers items such as garments which are hanging on hangers and to which a code has been attached indicating the item destination, and, based on information contained in the codes, distributes these items along diverging rails which run in the direction of transfer. Hereafter, the example used will be garments, however, other items may also be stored and retrieved using the apparatus of the present invention. The apparatus is provided with a transfer mechanism, which transfers the garments on hangers along a hanger main track, a distribution mechanism, which distributes the garments to their respective destinations, as indicated in the codes, and a control mechanism, which controls the distribution mechanism based on the information which is contained in the codes.

Preferably, the distribution mechanism is provided with a number of rail units and a guide mechanism which guides the garments along the rails.

It is also preferable that the rail units run horizontally and be connected to one another so as to form the main track.

It is also preferable that the rail units have a switching mechanism so as to switch a part of the main track based on a signal from the control mechanism.

It is furthermore preferable that the rail units run horizontally and be connected to each other so as to form the main track, and that the rail units have a switching mechanism so as to switch a part of the main track based on a signal from the control mechanism.

It is furthermore preferable that the rail units be connected in a horizontal direction and be composed of a primary part comprising the main track and a connecting part, and that there is, in this connecting part, a switching part which switches the main track and an actuating mechanism which switches this same switching mechanism.

It is furthermore preferable that the guide mechanism be installed at the ends of the diverging rails, and that when one part of the main track is opened, a garment which is raised and falls from the main track is guided onto the diverging rails.

It is furthermore preferable that the diverging rails be furnished with a pipe-form body and guide mechanism provided on the pipe-form body.

It is furthermore preferable that the guide mechanism have a guide part which is so arranged as to be capable of vertical movement with respect to the switching part of the main track.

It is furthermore preferable that the guide mechanism have an extension mechanism for the vertical movement of the guide part.

It is furthermore preferable that the guide mechanism have a guide part which is so arranged as to be capable of vertical movement with respect to the switching part of the main track and an extension mechanism for the vertical movement of the guide part.

It is furthermore preferable that the guide mechanism have a guide part which is so arranged as to be capable of vertical movement with respect to the switching part of the main track and an extension mechanism for the vertical movement of the guide part, and furthermore, that the guide part has a catching part which, during rising movement, enters the open area of the switching part of the main track, catching the hangers which fall from the switching part.

BRIEF DESCRIPTION OF THE DIAGRAMS

Figure 8:
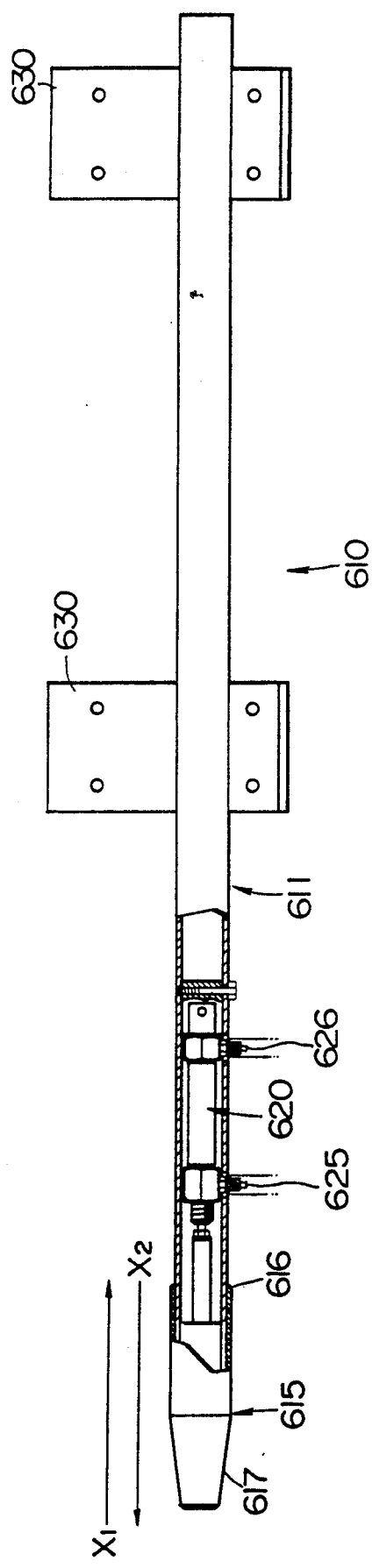
Figure 8:
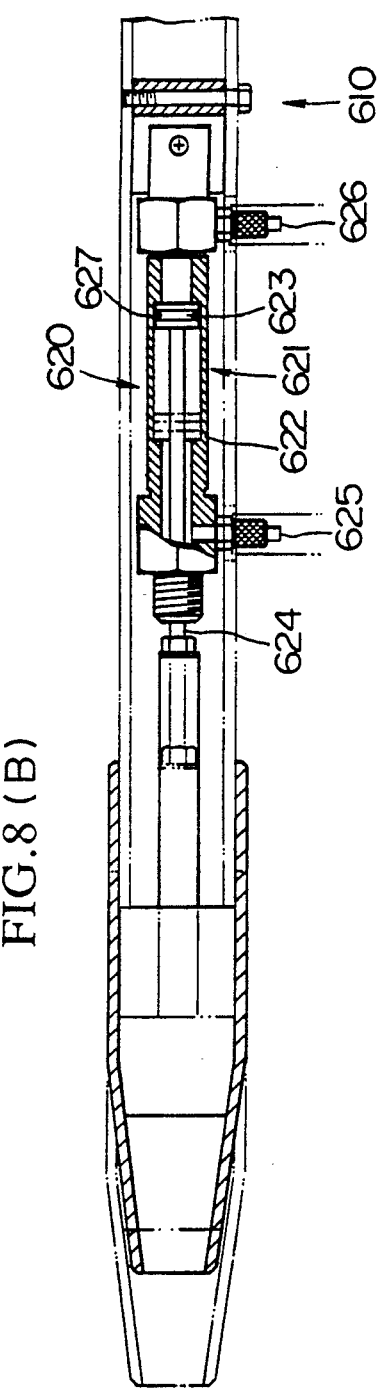

FIG. 8(A) is an elevation view showing a partial cutaway view of a rail unit, FIG. 8(B) is an enlarged cross-section showing the actualizing mechanism, FIG. 9(A) is an elevation view showing a partial cutaway view of a diverging rail, FIG. 9(B) is an enlarged cross-section showing the extension mechanism, FIGS. 10(A)-(F) are process diagrams showing the operation of the gap maintenance mechanism and the control mechanism.

DETAILED DESCRIPTION OF THE PREFERRED EMBODIMENTS

Hereinafter, a detailed description of an embodiment of the present invention will be given with reference to FIGS. 1 through 10.

Figure 1:
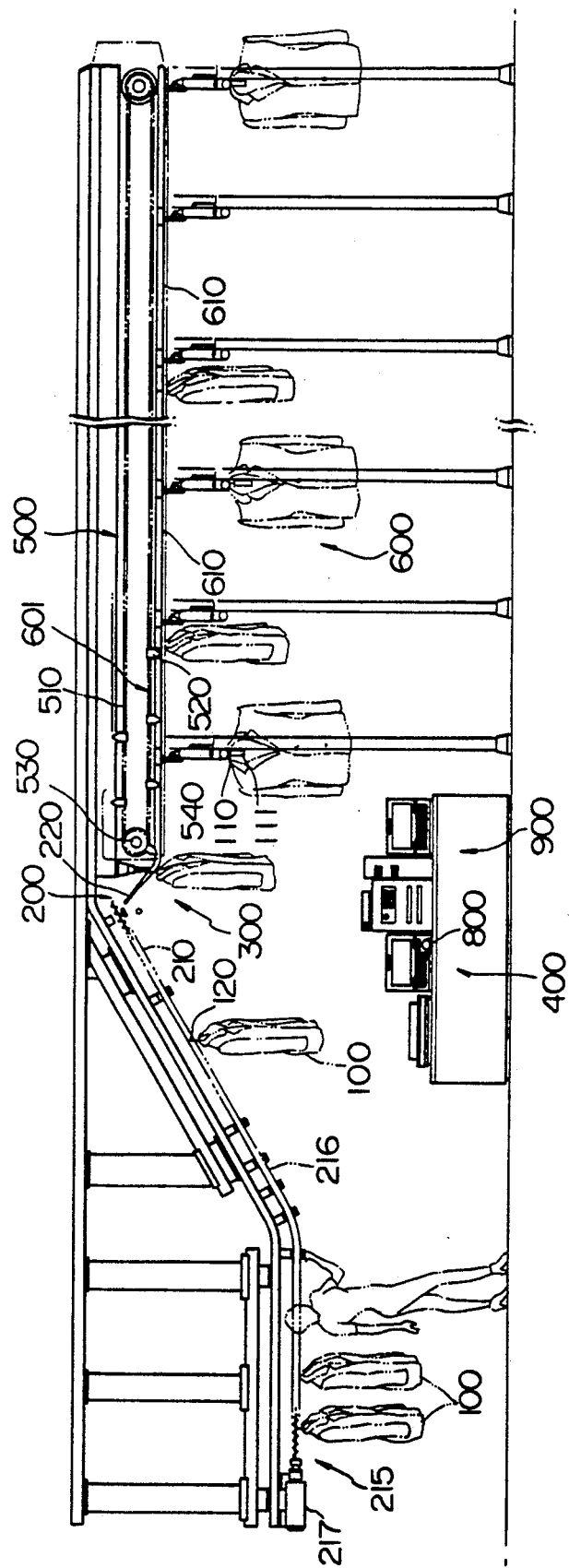
FIG. 1 is an elevation view showing a garment transfer apparatus relating to a preferred embodiment of the present invention.
Figure 2:
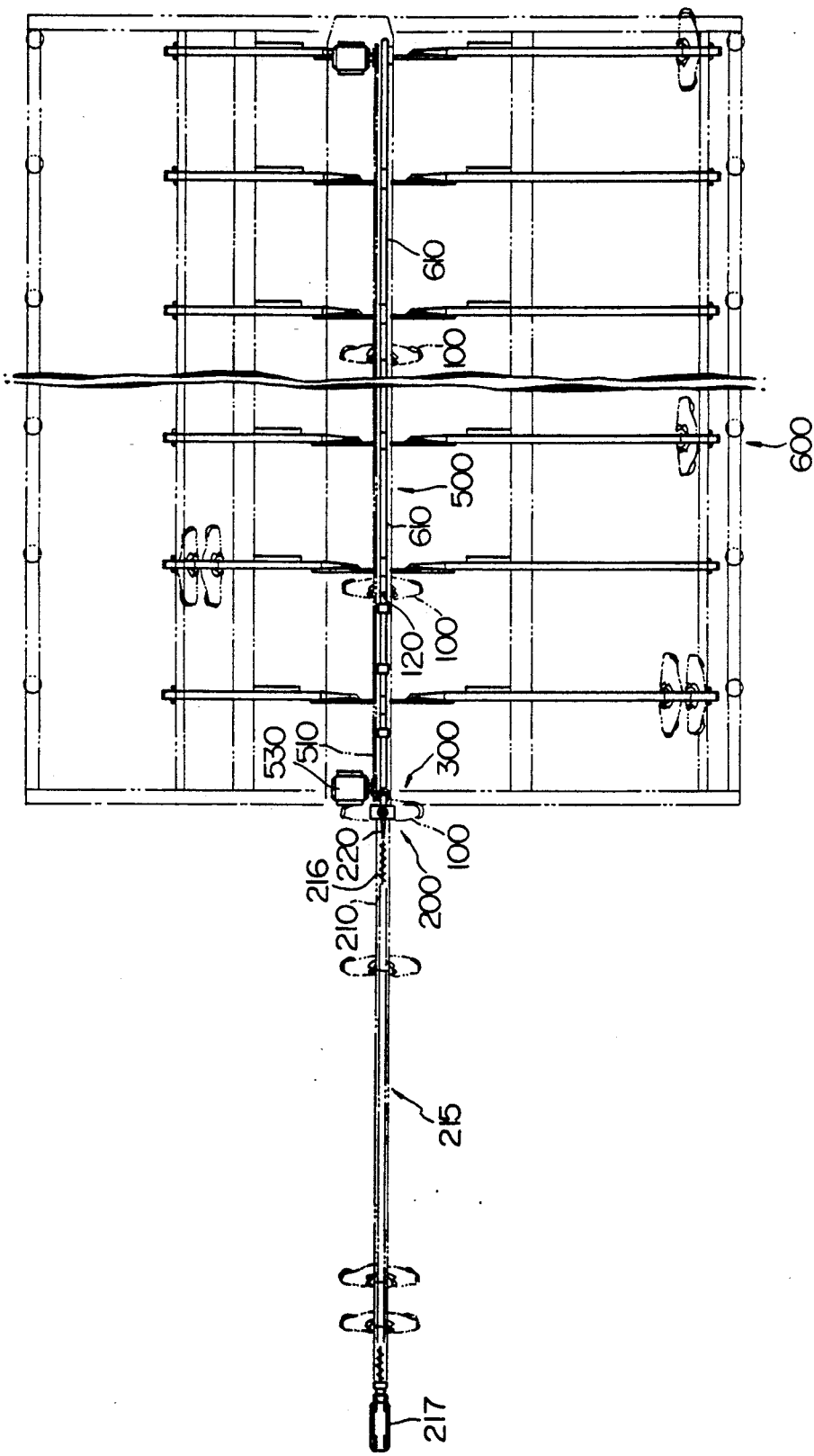
FIG. 2 is a planimetric figure of the garment transfer apparatus shown in FIG. 1.
Figure 3:
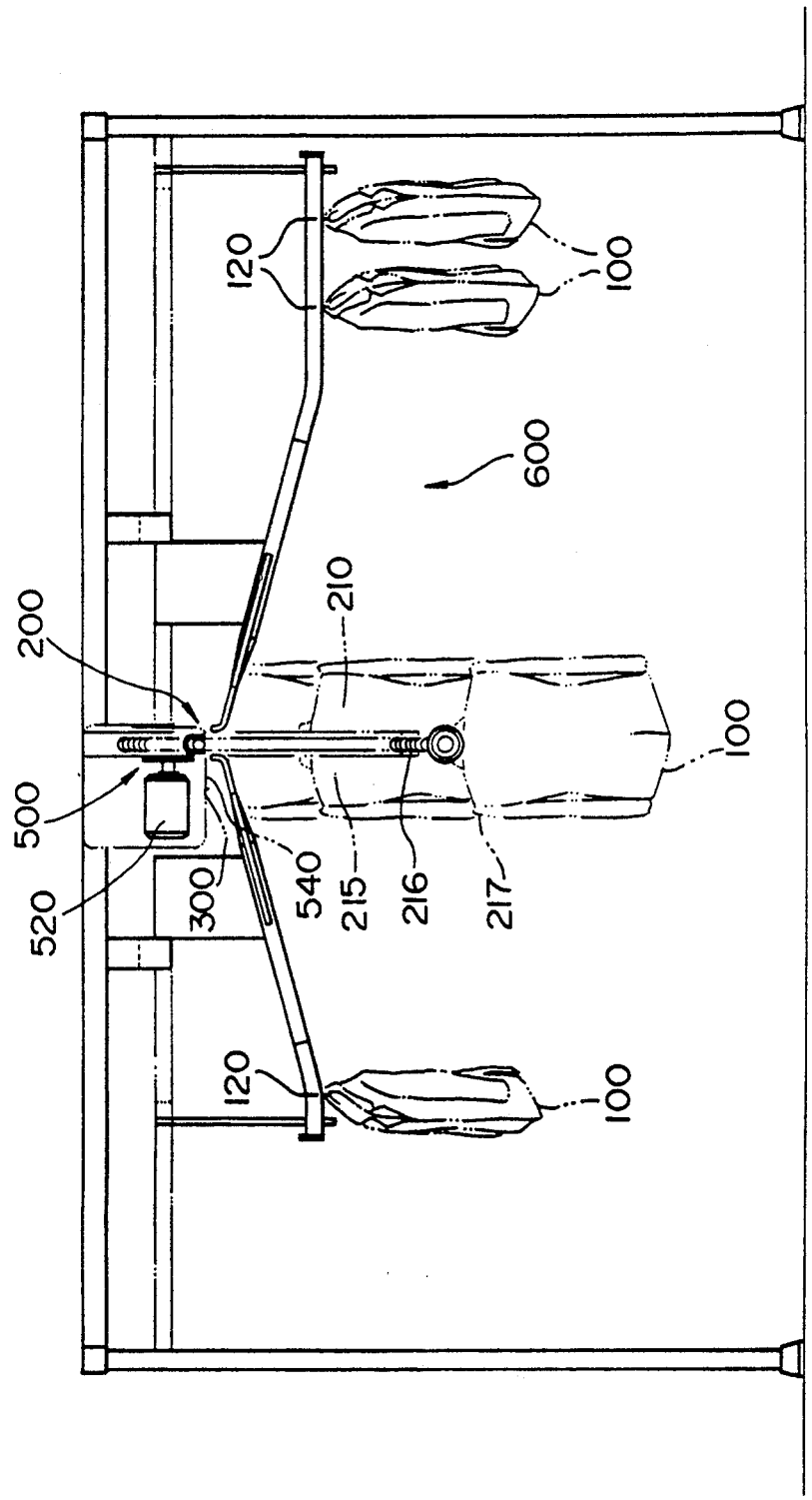
FIG. 3 is a side view of the garment transfer apparatus shown in FIG. 1.

As shown in FIGS. 1 to 3, the garment transfer apparatus according to the present invention transfers garments 100, which are hanging on hangers 120 and to which are attached the bar codes (codes) 111 which show the garment destinations, and distributes these garments, based on the information in bar codes 111, along a number of diverging rails 700 which are provided running in the transfer direction. In detail, the apparatus is provided with a transfer mechanism, which transfers the garments 100 hanging on hangers 120, a distribution mechanism 600, which distributes the garments 100 to their destinations, which are shown by the bar codes 111, and a control mechanism, which controls the distribution mechanism 600 based on the information contained in the bar codes 111.

Figure 4:
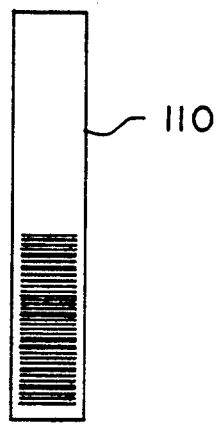
FIG. 4 is an elevation view showing the bar code which is to be used in the garment transfer apparatus of the present invention.

The bar codes 111, which are attached to the garments 100 which are distributed by the garment transfer apparatus related to the present preferred embodiment, and which show the places to which the garments are to go, can be attached to garments 100 by marking tag 110, as shown in FIG. 4. In addition to the destination of the garments 100, the same bar codes 111 also show the type of garment, such as pants, shirt, necktie, etc., the cleaning period, and the price. The point-of-sale system (hereinafter referred to as POS system) can be used in the garment transfer apparatus related to the present preferred embodiment.

Figure 5:
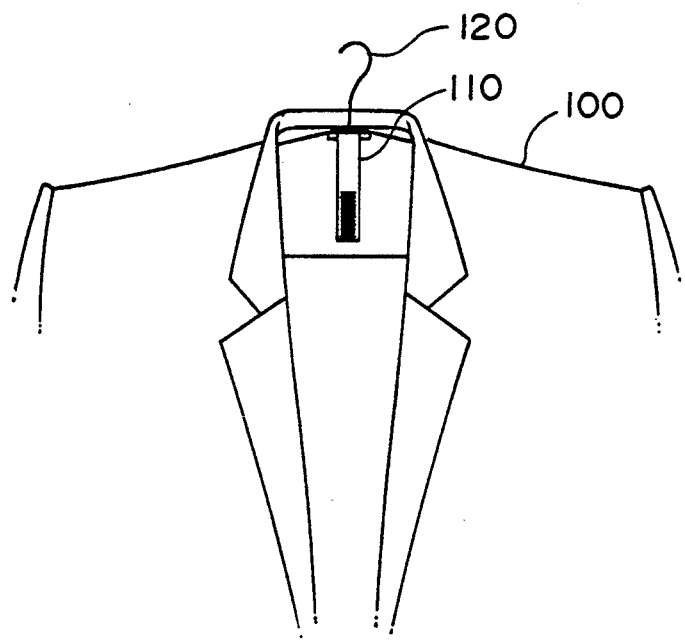
FIG. 5 is an elevation view showing one part of a garment to which the bar code shown in FIG. 4 is attached.

As FIG. 5 shows, the tag 110 on which the bar code 111 is marked is attached to the inside of the collar of a suit jacket. In this preferred embodiment, the tag 110 is attached to the inside of the collar; however, it is not limited to this location, but can be attached for example to a buttonhole or a like position where the tag 110 can be read by scanner 800. Furthermore, in the present preferred embodiment, a suit jacket was used as garment 100, but the preferred embodiment can be applied to garments 100 such as pants, shirts, neckties, etc.

Figure 6:
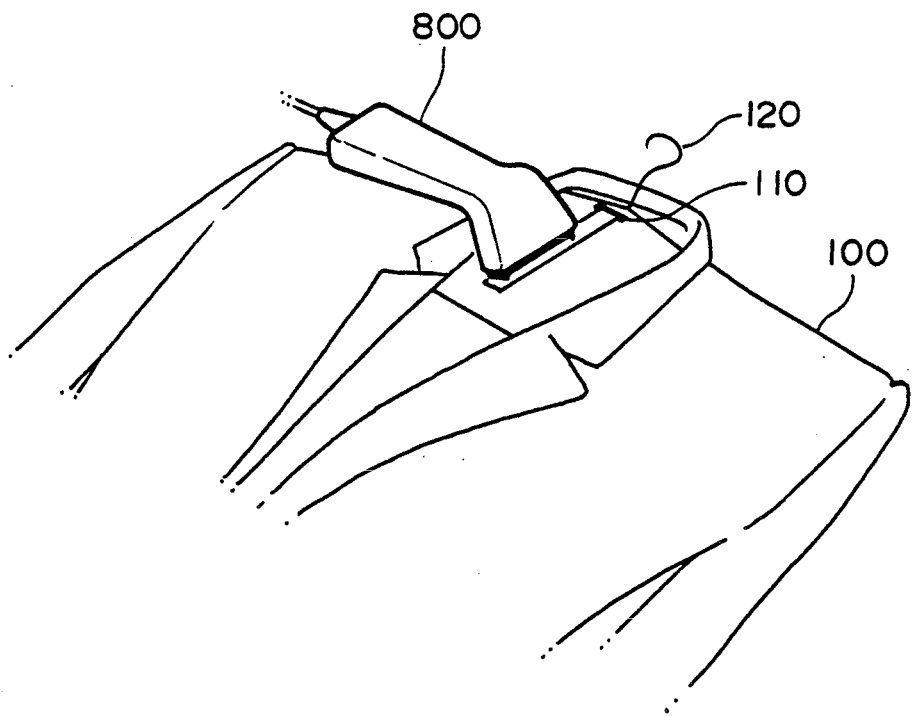
FIG. 6 is an angled view showing the situation in which the bar code is read by the reading scanner, which reads the bar code.

The information contained in the bar codes 111 can be read by scanner 800, as shown in FIG. 6.

The transfer mechanism contains sending mechanism 200 and horizontal transfer mechanism 500, which horizontally transfers the garments 100 which are transferred by the sending mechanism 200.

The sending mechanism 200 is composed of raising part 210, which contains raising mechanism 215, and lowering part 220.

The raising mechanism 215 in said raising part 210 is composed of worm gear 216 and a rotation mechanism which causes the same said worm gear 216 to rotate about its axis. The worm gear 216 has flexibility and can be bent in a direction perpendicular to its axis. Furthermore, by means of the rotation of the worm gear, the garments 100 hanging from the gear grooves thereof rise, and the worm gear is bent in the vicinity of its middle portion, so that the axis of the gear assumes an V shape when viewed from above. A standard electric motor 217 is used in the rotation mechanism. The lowering part 220 has a rod shape and is provided in an inclined manner so that the garments 100 can slide down the lowering part 220. The positional relationship of the raising part 210 and the lowering part 220 is such that the upper end of the raising part 210 is directly above the upper end of the lowering part 220.

Furthermore, in the present preferred embodiment, a gap maintenance mechanism, which controls the raising mechanism 215 and the sliding of the garments 100, is provided in the sending mechanism 200. This is so that two or more of the garments 100 are not hung from the same hanging part 520 of the horizontal transfer mechanism 500 described hereinafter.

Figure 7:
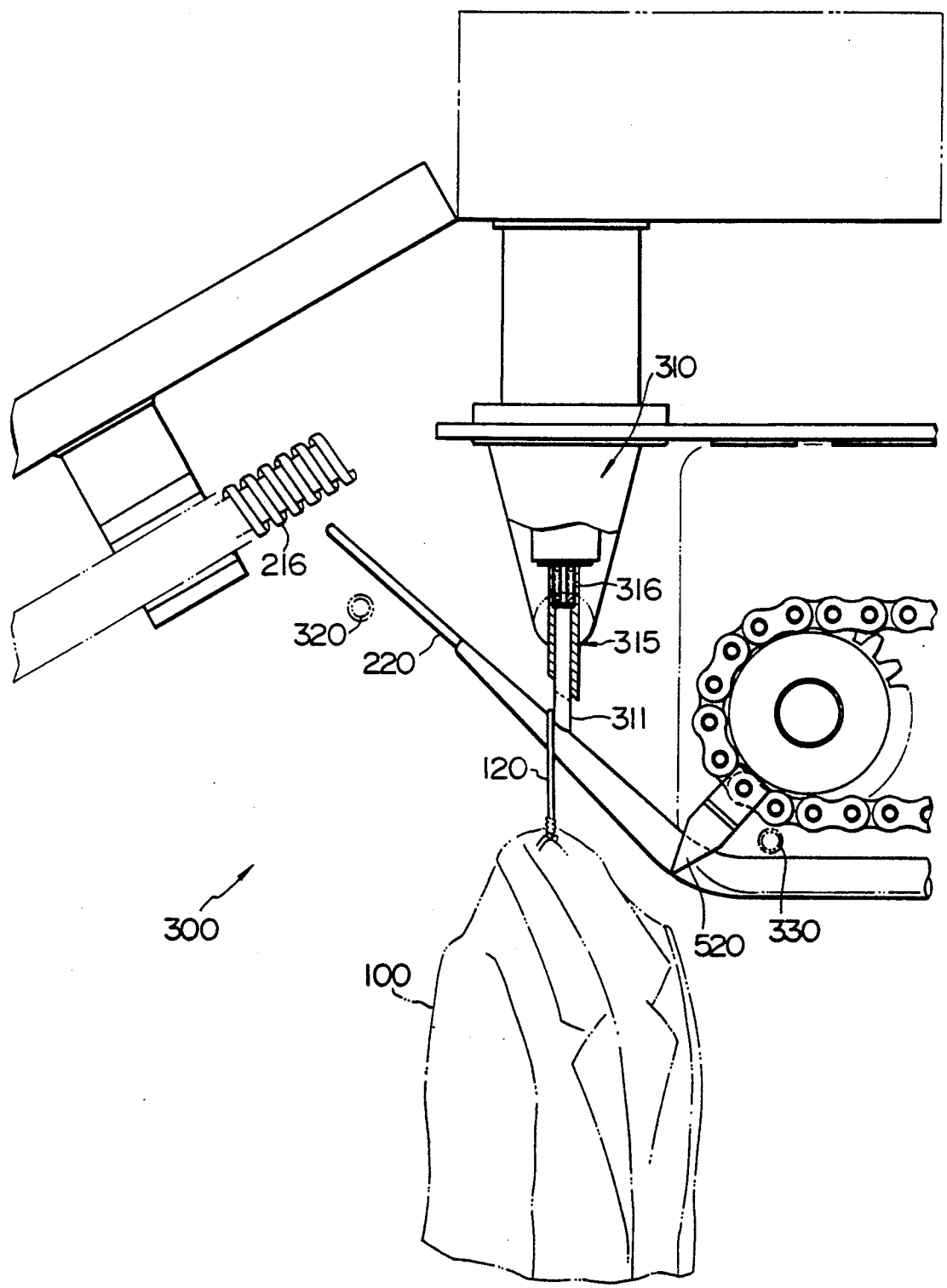
FIG. 7 is an enlarged elevation view showing a partial cutaway view of the gap maintenance mechanism which is used in a garment transfer apparatus.

The gap maintenance mechanism 300 will be described with reference to FIG. 7.

The gap maintenance mechanism is composed of stopping part 310, rotation mechanism stopping sensor 320, hanger release sensor 330, a calculation-processing mechanism, and a compressor. The stopping part 310 is provided in the vicinity of the lower end of the lowering part 220; it is composed of stopping rod 311 and pressure contact mechanism 315, which presses stopping rod 311 into contact with the upper surface of the lowering part 220. The pressure contact mechanism 315 presses the stopping rod 311 onto the upper surface of said lowering part 220 by using the restoring force of coil spring 316. In the present preferred embodiment, coil spring 316 is used in the pressure contact mechanism 315, but the present invention is not limited to this; other suitable means, for example magnetism, air pressure, or the like, could be used to realize an embodiment of the present invention. Furthermore, suitable means such as magnetism or the like could be used as the raising mechanism to realize an embodiment of the present invention. The rotation mechanism stoppage sensor 320 detects the passage of the hangers 120 upon which the garments 100 are hung and is provided in the vicinity of the upper end of the lowering part 220. The hanger release sensor 330 detects the passage of the hanging parts 520 described hereinafter and is provided below chain 510 described hereinafter. Optical sensors are used as the rotation mechanism stoppage sensor 320 and the hanger release sensor 330. The Calculation-processing mechanism stores the order in which the garments 100 pass the rotation mechanism stoppage sensor 320 based on detection signals from the rotation mechanism stoppage sensor 320, and sends a stoppage directive signal so that the rotation mechanism is stopped. Furthermore, based on detection signals from the hanger release sensor 330, the computation-processing apparatus sends a hanger-release directive signal which raises stopping rod 311 of stopping part 310, and sends a rotation directive signal which causes the worm gear 216 to rotate. The compressor is provided with a hanger-release switching valve; by opening this hanger release switching valve, the stopping rod can be raised. The hanger-release switching valve is thus related to the raising mechanism of the stopping rod 311. An electromagnetic valve or the like could be used in the construction of the hanger-release switching valve, and furthermore, suitable means such as an actuator or the like are sufficient for use to realize an embodiment of the present invention.

The horizontal transfer mechanism 500 has a number of hanging parts 520 which have a U shape when viewed from above, a chain 510, to which the bases of the U-shaped hanging parts 520 are affixed, and a driving mechanism 530 which drives the chain 510. Both ends of the U-shaped hanging parts 520 which belong to the chain 510 are provided in such a manner as to straddle the main track 601 of hangers 120. An electric motor is used in the drive mechanism 530. The present invention is of course not limited to an electric motor; other suitable means may be used to realize an embodiment of the invention.

In addition, in the present preferred embodiment, a sheet cover 540 is provided below the chain 510 so that lubricant from the chain 510 does not soil the garments 100.

The distribution mechanism 600 runs in a lengthwise direction and has a plurality of rail units 610, which form the said main track 601 by means of being connected to each other, and have switching mechanisms to open and close a portion of the main track 601 by means of a signal from the control mechanism, and guide mechanisms installed at the forward end of diverging rails 700 which guide onto the diverging rails 700 the garments 100 which are raised when one part of the main track 601 is opened and then fall from the main track 601.

As FIGS. 8(A) and 8(B) show, the rail units 610 are connected in a lengthwise direction and are composed of main parts 611 and their connecting parts, comprising main track 601. In addition, switching part 615 which switches main track 601 and actualizing mechanism 620 which switches the same switching mechanism 615 are present in the connecting parts.

The switching part 615 is provided with engaging part 616 on one end, and on the other end tapered part 617 is provided. The engaging part 616 engages with the outer side of said main part 611. The tapered part 617 engages within the end of the main part 611 of another rail unit 610 when the switching part 615 is closed, and when the switching part 615 is open, the tapered part detaches from the end of the main part 611 of the other rail unit 610, and the end of the tapered unit maintains a gap of a fixed distance from the end of the other main part 611. The actualizing mechanism 620 is composed of an air cylinder 621 and a compressor which sends compressed air to the air cylinder 621. The air cylinder 621 has a cylinder body 622, a freely-moving piston 623 within the cylinder body 622, and a switching rod 624 which is connected to the piston 623. The cylinder body 622 has an opening air intake/exhaust port 625 and a closing air intake/exhaust port 626. By means of connecting the switching rod 624 to the switching part 615, the operation of the piston 623 is linked and the switching part 615 becomes freely switchable. Numeral 627 is the sealing and numeral 630 is an installation part. The compressor is provided with an opening switching valve and a closing switching valve. The opening switching valve and the closing switching valve open by means of an opening directive signal and a closing directive signal respectively. Electromagnetic valves or the like could be used in the switching mechanism of the opening switching valve and the closing switching valve as suitable means to realize an embodiment of the present invention. Furthermore, in the present preferred embodiment, air cylinder 621 was used in the actualizing mechanism 620, but the present invention is not limited to this; aside from air cylinder 621, for example, actuators using something other than air pressure, magnetically actuating apparatuses, etc., could be used as suitable means to realize an embodiment of the present invention.

As is shown in FIGS. 9(A) and 9(B), the diverging rails 700 have a cylindrical base body 710, an end part 720, and a guide mechanism. Furthermore, the diverging rails 700 are perpendicular to the lengthwise direction of main track 601. In addition, in the case in which the guide rod is raised by extending the guide part 736, the catching part 740 provided on the end of the guide rod is positioned in the opened part of the main track 601. This is so that the garments 100 which fall from the opened part of the main track 601 can be guided onto the diverging rails 700.

The end part 720 has a generally rounded, tapering, hollow form and has grooves 721 which run in a diagonal direction when viewed from above.

The guide mechanism has extending and retracting mechanism 730 and guide part 736.

The extending and contracting mechanism 730 is provided with an air cylinder 731 which is identical to that in a rail unit 610; by the connection of the extension/retraction rod 734 of the air cylinder 731 with a support rod 737, the guide part 736 is linked to the operation of the piston 733 and can be extended. The guide part 736 is composed of support rod 737 and guide rod 739. Numeral 731 is the air cylinder, numeral 732 is the cylinder body, numeral 745 is the opening air intake/exhaust port, numeral 746 is the closing air intake/exhaust port, and numeral 747 is the seal.

One end of the support rod 737 is within the end part 720 and the pipe-form body 710 of the diverging rails 700; it is connected to the extension/retraction mechanism 730. A bent portion is provided on the other end of the support rod 737. As will be stated hereinafter, this is so that the forward end portion of the support rod 737 can be welded to the guide rod 739 Furthermore, the support rod 737 is provided with spacer 738. The spacer 738 is in plate form and can engage with the grooves 721 provided in the forward end part 720. This is so that the extension and retraction of the guide part 736 is not disturbed. Furthermore, the spacer 738 is positioned in the vicinity of the middle of the support rod 737 so as to achieve integral construction.

The guide rod 739 is provided with a catching part 740 at its end portion. This is so that the garments 100 which fall from the opened portion of the main track 601 can be easily guided onto the diverging rails 700. The catching part 740 is formed by the bending of the forward end portion of the guide part 736 at an angle which will facilitate the catching of the garments 100.

The joining of the support rod 737 and the guide rod 739 is accomplished by welding the bent portion provided at the forward end of the support rod 737 to the guide rod 739 in the vicinity of the forward end thereof. This is so that the guide rod 739 can follow the expansion and contraction of the support rod 737. Furthermore, the side surface of the spacer 738 is welded to said guide rod 739. In conjunction with the bent portion of the support rod 737, a fixed gap is provided between the support rod 737 and the guide rod 739. Numeral 770 is the catching part.

The control mechanism is composed of an opening directive sensor 750, a closing directive sensor 760, a scanner 800, a calculation-performing apparatus 400, and a compressor.

Optical sensors are used in the opening directive sensor 750 and the closing sensor 760. Furthermore, so that the passage of the hanging parts 520 can be detected, the opening directive sensor 750 and the closing directive sensor 760 are provided below the drive mechanism 530 in such a way as to detect the passage of the hanging parts 520. In the present preferred embodiment, optical sensors are used in the rotation mechanism stopping sensor 320, the hanger release sensor 330, the opening directive sensor 750 and the closing directive sensor 760, but the present invention is not limited to this; detection of the passage of the garments 100 or of the hooked parts of the hangers 120 from which the garments 100 hang is acceptable. For example, magnetic sensors, ultrasonic sensors, or the like, could be used to realize an embodiment of the present invention. A gun-type scanner is used as the scanner 800. In the present preferred embodiment, a gun-type scanner 800 is used, but the present invention is not limited to this form; other suitable scanners 800, such as a rotating-mirror type, a hologram type, or the like could be used to realize an embodiment of the present invention. The calculation-processing apparatus 400 stores the reading signal read by the scanner 800 as well as the order of reading, and, based on the detection signals from the opening directive sensor 750 and the closing directive sensor 760, sends a opening directive signal or a closing directive signal, or a raising directive signal or a closing directive signal to the compressor. The compressor is provided with an opening switching valve and a closing switching valve. The opening switching valve is connected to the opening air intake/exhaust ports 625 and 745 and opens based on the opening directive signal. The closing switching valve is connected to the closing air intake/exhaust ports 626 and 746 and opens based on the closing directive signal.

Furthermore, in the present preferred embodiment, the calculation-performing apparatus 400 is linked to a POS terminal 900, and a POS system is thereby introduced.

Next, the operation and method of use of the garment distribution apparatus of the present preferred embodiment will be explained.

First, using the scanner 800, the user reads the bar Code 111 marked on the tag 110 attached to a garment 100.

Next, the hanger 120 from which the garment 100 is hanging is hung from a worm gear 216.

Then, by means of the rotation of the worm gear 216, the hanger 120 is raised on raising part 210 of the sending mechanism 200.

Next, the garment 100 climbs to the upper end of the raising part 210, falls to the upper end of said lowering part 220, and slides from the upper end of lowering part 220 in the direction of the lower end thereof.

Next, the rotation mechanism stopping sensor detects the passing of the garment 100 and sends a detection signal to the calculation-processing apparatus 400.

Next, the calculation-processing apparatus 400 receives a detection signal from the rotation mechanism stopping sensor 320, sends a stopping directive signal to the rotation mechanism of the worm gear 216, and stores the order of the passing of the garment 100.

Next, the rotation mechanism receives the stopping directive signal and stops this rotation. When the rotation mechanism has been stopped, the raising of the following garment 100 on raising part 210 is stopped.

Next, the stopping part 310 provided in the lowering part 220 stops the sliding of the hanger 120 on which the garment 100 is hanging.

Next, when the hanger release sensor 330 detects the passage of the hanging part 520 in the horizontal transfer mechanism 500, it sends a detection signal to the computation-processing apparatus 400.

Next, the computation-processing apparatus 400 sends the hanger release directive signal to the compressor, which is connected to the stopping part 310, and sends a rotation directive signal to the rotation mechanism of the worm gear 216.

Next, based on the hanger release directive signal, the switching mechanism opens the hanger release switching valve. When the hanger release switching valve has been opened, the compressor sends compressed air to the stopping part 310.

Next, the compressed air raises the stopping rod 311.

Next, the stopping rod 311 releases the garment 100. When the stopping rod releases the garment 100, the garment 100 slides down the lowering part 220.

Next, the rotation mechanism begins to operate again based on the rotation directive signal, and thus the rotation of the worm gear 216 begins.

As the pressure of the compressed air falls, when the force of the coil spring 316 pressing on the lowering part 220 becomes greater than the force of the compressed air raising the stopping rod 311, the coil spring 316 will again press the stopping rod 311 into contact with the lowering part 220 by means of its restoring force.

Next, the garment 100, which has slid down the lowering part 220, stops in the vicinity of the entrance to the main track 601.

Next, the hanging part 520 of the horizontal transfer mechanism 500 catches the hooking part of the hanger 120 on which the garment 100, which has stopped in the vicinity of the entrance to the main track 601, is hanging and transfers the hanger 120 in a horizontal direction.

Next, the opening directive sensor 750 detects the passing of the hanging part 520.

Next, the calculation-processing apparatus 400 processes the detection signal sent by the opening directive sensor 750, the reading signal of the scanner 800, and the order of reading, which are stored in memory, and the point in the order in which the garment 100 passed the rotation mechanism stopping sensor 320; and by means of this processing determines the place to which the garment is to be sent.

Next, based on the determination, the calculation-processing apparatus 400 sends an opening directive signal to the switching mechanism of the opening switching valve with which the compressor is provided, and based on this opening directive signal the switching mechanism opens the opening switching valve.

Next, the compressor sends compressed air to opening air intake/exhaust ports 625 and 745 of air cylinders 621 and 731 with which the rail unit 610 and the diverging rails 700 are provided.

Next, by means of the compressed air, the main track 601 is opened by means of the retraction of the switching part 615 of the rail unit 610. Furthermore, the catching part 740 of the guide rod 739 is positioned in the opened part of the main track 601, so that by means of the extension of the guide part 736 the catching part 740 is raised.

When the main track 601 opens, the garment 100 in question falls from the opened part.

Next, the catching part 740 positioned in the opened part of the main track 601 catches the hooked part of the hanger 120 on which the garment 100 is hanging and guides it to the diverging rail 700.

Next, the garment 100 which was guided to the diverging rail 700 slides down the diverging rail 700.

Next, the stop which is provided at the lower end of the diverging rail 700 stops the hooking part.

Next, when the hooking part detected by the opening directive sensor 750 passes the closing directive sensor 760, the closing directive sensor 760 sends a detection signal to the calculation-processing apparatus 400, and, based on the detection signal, the calculation-processing apparatus 400 sends a closing directive impulse to the switching apparatus of the closing switching valve with which the compressor is provided.

Next, the based on the closing impulse directive, the switching apparatus opens the closing switching valve.

When the closing switching valve is opened, the compressor sends compressed air to the closing air intake/exhaust ports 626 and 746 of the air cylinders 621 and 731 with which the rail unit 610 and the diverging rail 700 are provided.

When the compressor sends compressed air to the opening air intake/exhaust ports 625 and 745, the guide part 736 retracts, and, by means of the extension of the switching part 615 of the rail unit 610, the main track 601 is closed.

Next, the operation of the gap maintenance mechanism and the control mechanism will be explained with reference to FIGS. 10(A)-(F).

Figure 10A:
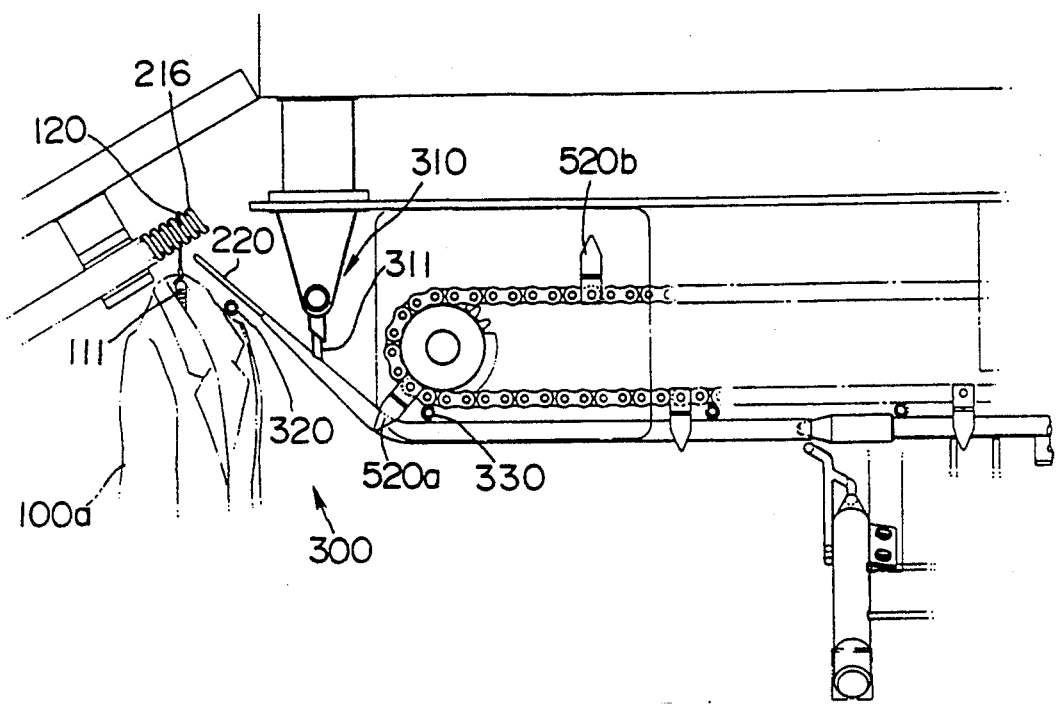

As FIG. 10(A) shows, the worm gear 216 transfers the garment 100a to its upper end.

Next, when the garment 100a falls from the upper end of the worm gear 216 and slides down the lowering part 220, the rotation mechanism stopping sensor 320 detects the passage of the garment 100a at the time of the sliding and sends a detection signal to the calculation-processing apparatus.

Next, based on the detection signal from the rotation mechanism stopping sensor 320, the calculation-processing apparatus sends a stopping directive signal to the rotation mechanism of the worm gear 216, and stores the location in the order at which the garment 100a passed the rotation mechanism stopping sensor 320.

Based on the stopping directive signal, the rotation mechanism stops.

Figure 10B:
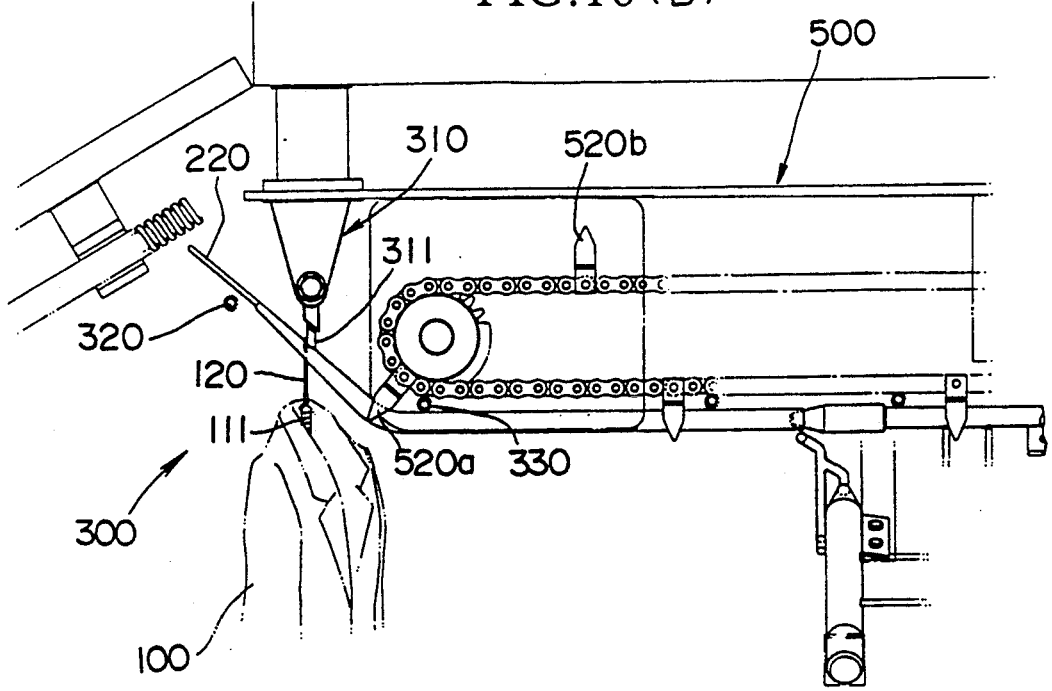

When the garment 100a slides down the lowering part 220, as shown in FIG. 10(B), the stopping part 310, constituting the gap maintenance mechanism, stops the garment 100a.

Figure 10C:
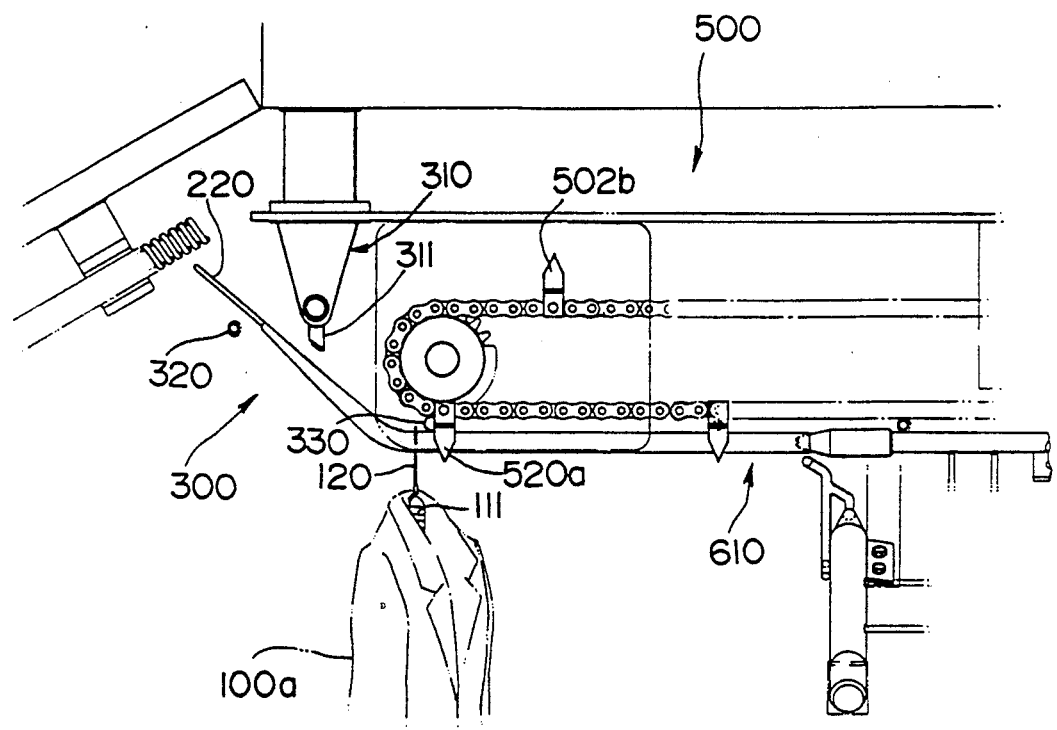

Next, as shown in FIG. 10(C), when the hanging part 520a in the horizontal transfer mechanism 500 passes the hanger release sensor 330 in the gap maintenance mechanism, the hanger release sensor 330 sends a detection signal to the calculation-processing apparatus.

Next, based on the detection signal from the hanger release sensor 330, the calculation-processing apparatus sends the hanger release signal to the compressor of the stopping part 310.

Next, based on the hanger release signal, the hanger release switching valve, with which the compressor is provided, is opened, the compressed air of the compressor raises the stopping rod 311, and the garment 100a is released.

When the stopping part 310 releases, the garment 100a moves down the lowering part 220 towards the main track 601 which forms the rail unit 601, and stops in the vicinity of the main track 601.

Figure 10D:
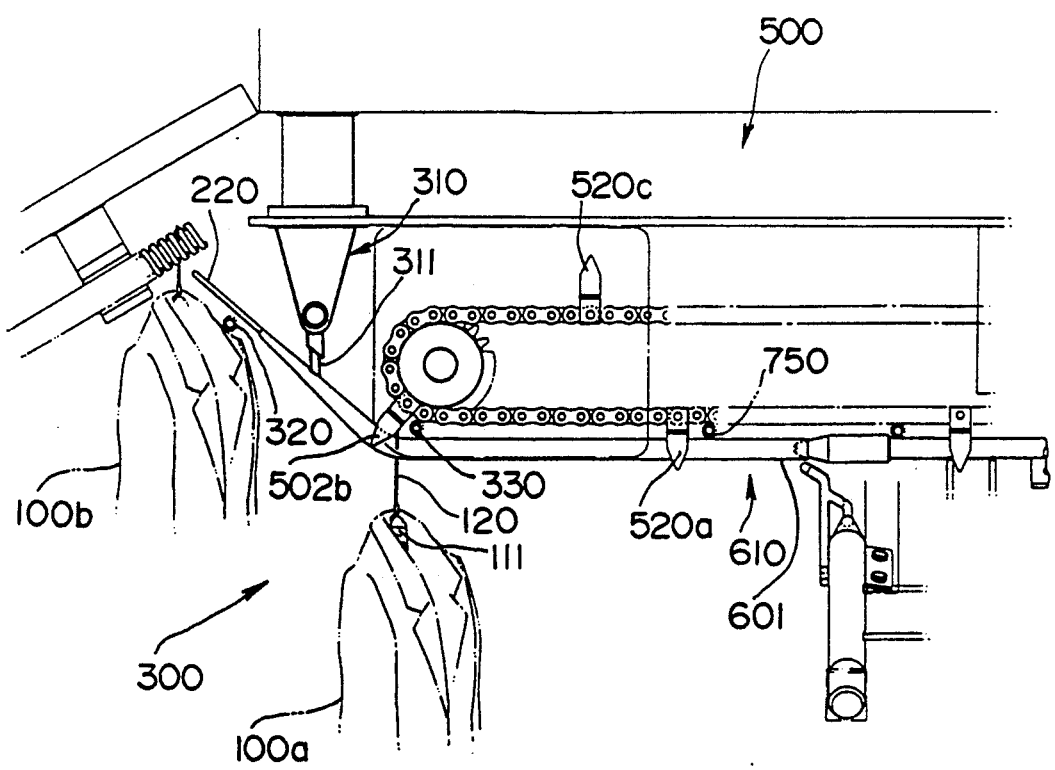

Next, as FIG. 10(D) shows, the hanging part 520b which follows the hanging part 520a catches the hooked part of the hanger 120 on which the garment 100a is hanging and transfers it in a horizontal direction.

Figure 10E:
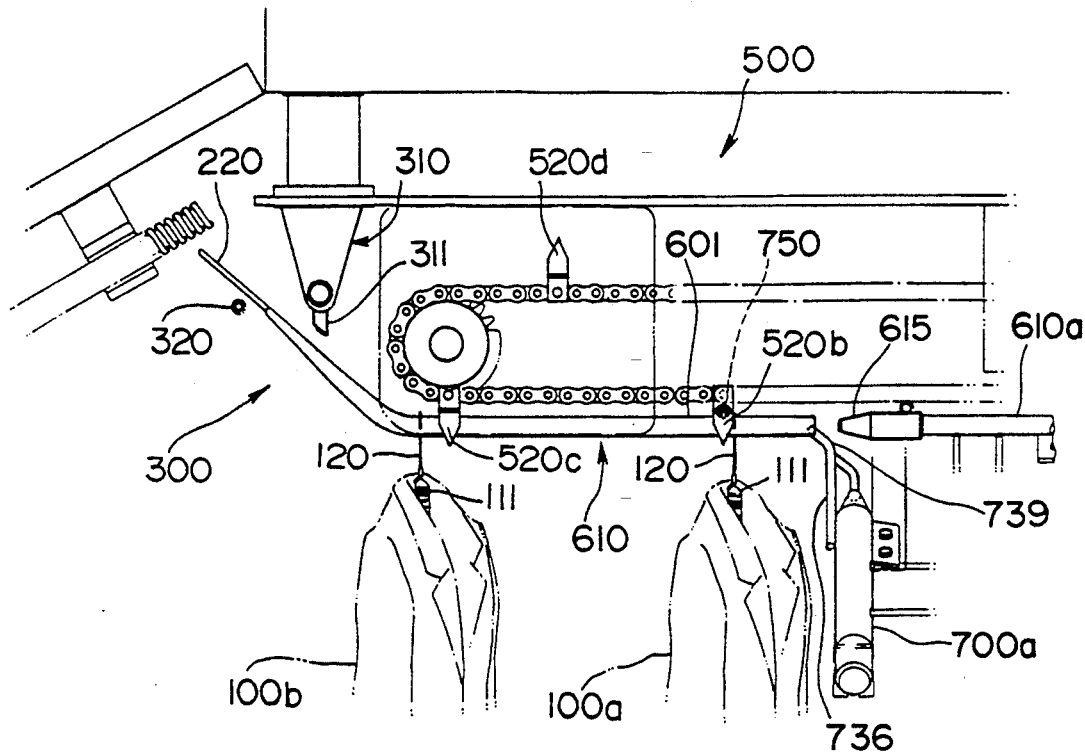

Next, as FIG. 10(E) shows, when the hanging part 520b which transfers the garment 100a passes the opening directive sensor 750, the opening directive sensor 750 sends a detection signal to the computation-processing apparatus.

Next, the computation-processing apparatus processes this detection signal, the reading signal of the bar code 111 attached to the garment 100a which was read by the scanner 800, as well as its position in the reading order, and the location of the garment 100a in the order of passing of the rotation mechanism stopping sensor 320, and thus determines the destination of the garment 100a. The computation-processing apparatus sends an opening directive signal to the switching mechanism of the opening switching valve with which the compressor is provided so that compressed air is sent to the rail unit 610a and the diverging rail 700a provided at this destination.

Next, by means of the compressed air, the switching part 615 of the rail unit 610 retracts and the main track 601 opens. Furthermore, the guide part 736 of the diverging rail 700 extends and the guide rod 739 is raised so that the garment 100a that has fallen from the open portion of the main track 601 can be guided onto the diverging rail 700.

Next, when the hanging part 520b transfers the garment 100a, the garment 100a falls from the opened portion of the main track 601.

Next, the guide part 736 catches the hooked part of the hanger 120 on which the garment 100a that has fallen is hanging, and guides it onto the diverging rail 700.

Figure 10F:
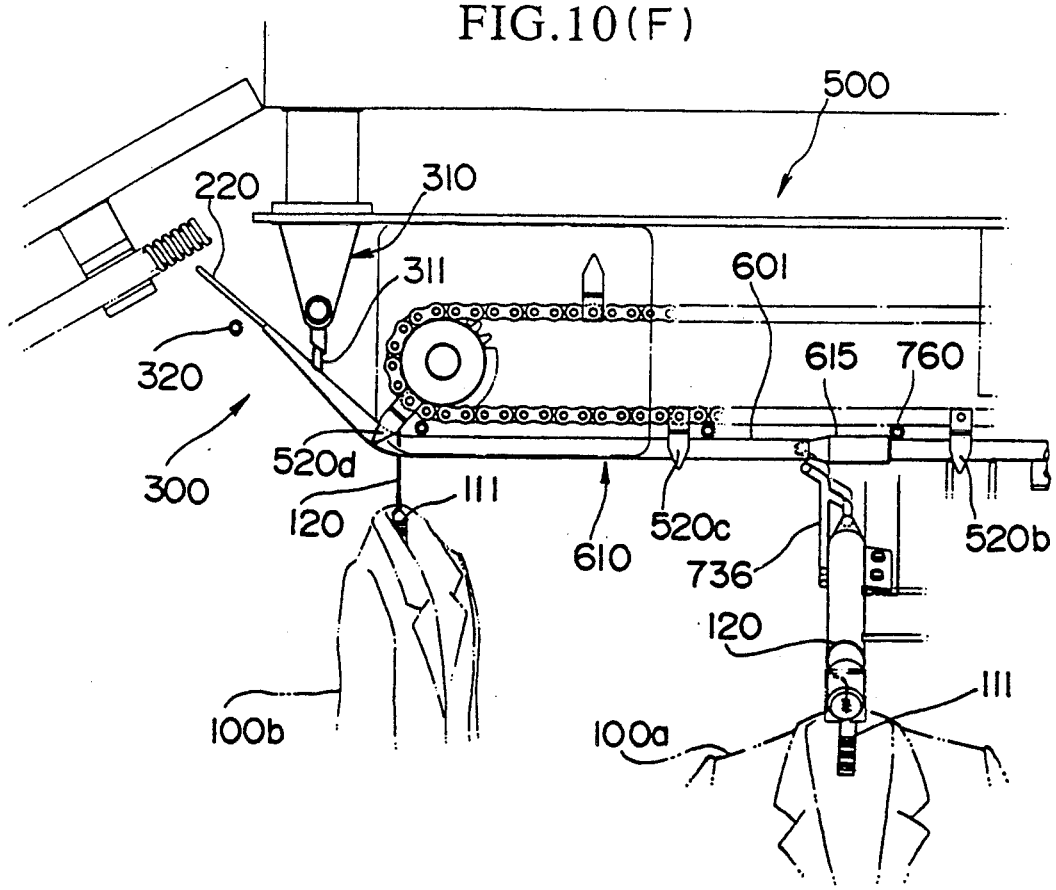

Next, as is shown in FIG. 10(F), when the hanging part 520b passes the closing directive sensor 760, the closing directive sensor 760 sends a detection signal to the computation-processing apparatus.

Next, the computation-processing apparatus sends a closing directive signal to the switching apparatus of the closing switching valve with which the compressor is provided.

Next, by means of the compressed air, the guide part 736 goes down, and the switching part 615 of the rail unit 610 extends. As a result, the main track 601 closes.

When hanging part 520c passes the hanger release sensor 330, the stopping part 310 releases the garment 100b. Then the garment 100b which follows the garment 100a goes down the lowering part 220, and the hanging part 520d stops the hooked part of the hanger 120 on which the garment 100b hangs.

The garment transfer apparatus of the present preferred embodiment handles the garments 100 which follow the garment 100b in an identical manner.

Next, the operation of the garment transfer apparatus according to the present preferred embodiment will be explained.

A tag 110 on which a bar code 111 is marked is attached to the garments 100 which are distributed by the garment transfer apparatus of the present preferred embodiment; as this bar code 111 shows the destination, it is possible to specify the place to which the garment 100 is to be sent. Furthermore, in the present preferred embodiment, the type of garment 100, its cleaning period, and the price are marked on the tag 110 in addition to the destination of the garment 100. Accordingly, it is possible to achieve a concentration of administrative information concerning the type of the garment 100 and so forth in the bar code 111.

The computation-processing apparatus, which is connected to the scanner 800, stores the reading signal and the position in the reading order.

The computation-processing apparatus 400 is connected to POS terminal 900, so that the information shown by the bar code 111 on the type of garment, etc., of the garment 100 can be sent to the POS terminal 900.

The lowering part 220 has a rod form which allows objects to slide down the lowering part 220 and is provided in a sloping manner. Accordingly, it is possible for the garment 100 to slide from the upper end of lowering part 220 in the direction of the lower end thereof.

The rotation mechanism stopping sensor 320 detects the passage of the garment 100 when the garment 100 slides down the lowering part 220, and sends a detection signal to the computation-processing apparatus 400.

The computation-processing apparatus 400 receives the detection signal from the rotation mechanism stopping sensor 320, sends a stopping directive signal to the rotation mechanism of the worm gear 216, and stores the position of the garment 100 in the order of passage.

The rotation mechanism receives the stopping directive signal and stops the rotation. The stopping of the rotation mechanism stops the raising of the following garments 100 on the raising part 210.

The stopping part 310 provided at the lowering part 220 stops the sliding down of the hanger 120 on which is hanging the garment 100.

When the hanger release sensor 330 detects the passage of the hanger part 520 in the horizontal transfer mechanism 500, it sends a detection signal to the computation-processing apparatus 400.

The computation-processing apparatus 400 sends the hanger release directive signal to the switching apparatus of a hanger release switching valve with which the compressor which is connected to the stopping part 310 is provided. It furthermore sends a rotation directive signal to the rotation mechanism of the worm gear 216.

Based on the hanger release directive signal, the switching apparatus opens the hanger release switching valve.

When the hanger release directive signal valve is opened, the compressor sends compressed air to the stopping part 310. The compressed air is of a pressure which is greater than the restorative force of the coil spring 316 which presses the stopping rod 311 onto the lowering part 220. Accordingly, the compressed air can raise the stopping rod 311.

When the stopping rod 311 is raised, the garment 100 is released. The lowering part 220 has a smooth rod form and is provided in a sloping manner, so that the garments 100 can slide down the lowering part 220. Accordingly, the garment 100 can slide down the lowering part 220.

As the gap maintenance mechanism performs its operations in the above manner, the number of said hangers 120 hanging from a hanging part 520 in the horizontal transfer mechanism 500 does not exceed one.

When the rotation mechanism begins to operate again based on the rotation directive signal, as a result of this operation the worm gear 216 rotates.

When the stopping part 310 is raised and the garment 100 slides down, the coil spring 316 again presses, by means of its restorative force, the stopping rod 311 onto the lowering part 220. By means of this, the stopping rod 311 is able to stop a second garment 100 which follows a first garment 100.

The garment 100 which slides down the main track 601 stops in the vicinity of the entrance to the main track 601 as a result of the friction between the main track 601 and the hooked part of the hanger 120.

The horizontal transfer mechanism 500 drives the hanger 120 along the main track 601. The hanging part 520 of the horizontal transfer mechanism 500 is able to catch the hooked part of the hanger 120. Accordingly, the horizontal transfer mechanism 500 is able to transfer the garment 100 hanging from the hanger 120.

The main track 601 of the distribution mechanism 600 stops the hooked part of the hanger 120 on which the garment 100 which is sliding down is hanging.

The hanging part 520 of the horizontal transfer mechanism 500 catches the hooked part, and the garment 100 is transferred in a horizontal direction.

The opening directive sensor 750 detects the passage of the hanging part 520.

The computation-processing apparatus 400 processes the detection signal sent by the opening directive sensor 750, the reading signal from the scanner 800, as well as its position in the reading order, which have been stored, and its position in the order of passage of the rotation mechanism stopping sensor 320, and thus determines the destination. Based on the determination, the computation-processing apparatus 400 sends a opening directive signal to the switching apparatus of the opening switching valve with which the compressor is provided.

Based on the opening directive signal, the switching mechanism opens the opening switching valve.

When the opening switching valve opens, the compressor sends compressed air to the opening air intake/exhaust ports 625 and 745 with which the cylinder bodies 622 and 732 of the air cylinders 621 and 731 belonging to the rail unit 610 and the diverging rails 700 are provided.

The compressed air which enters from the opening air intake/exhaust ports 625 and 745 adds pressure to the pistons 623 and 733. By means of the pressure, the pistons 623 and 733 slide.

Since the switching rod 624 is connected to the switching part 615 and the piston 623, it is able to move in the direction indicated by the arrow $X_1$ in FIG. 8(A) in conjunction with the sliding of the piston 623. Furthermore, since the extension/retraction rod 734 is connected to the guide part 736 and the switching part 615, the guide part 736 is able to move in the direction indicated by the arrow $Z_1$ in FIG. 9(A) in conjunction with the sliding of the piston 733. In other words, in conjunction with the sliding of the pistons 623 and 733, the switching part 615 retracts and the guide part 736 extends.

When the switching part 615 retracts, the tapered part 617 detaches from the main part 611 of rail unit 610 which is engaged therewith, and a gap is opened between the end part of the tapered part 617 and the end part of the main part 611. Accordingly, it is possible to open the main track 601.

Furthermore, when the guide part 736 extends, the guide rod 739 is raised.

In the garment transfer apparatus according to the present invention, in the case in which the guide rod 739 is raised, the diverging rail 700 is so provided that the catching part 740 of the guide rod 739 is positioned in the opened portion of the main track 601. Accordingly, the diverging rail 700 is able to catch the garment 100.

When the garment 100 that is stopped by the hanging part 520 is transferred to the opened portion of the main track 601, the garment 100 falls from the main track 601.

The guide part 736 catches the hooked part of the hanger 120 on which the garment 100 is hanging and guides it to the diverging rail 700.

Since the control mechanism, as above, controls the distribution mechanism 600 so that the garment 100 can be guided to the diverging rail 700, the garment 100 can be sent to its target location.

The diverging rail 700 has a smooth rod form and is provided in a sloping manner, so that the garment 100 can slide down.

The stop provided at the lower end of the diverging rail 700 stops the hooked part.

When the hooked part detected by the opening directive sensor 750 passes the closing directive sensor 760, the closing directive sensor 760 sends a detection signal to the computation-processing apparatus 400.

Based on the detection signal, the computation-processing apparatus 400 sends a closing directive signal to the switching mechanism of the closing switching valve with which the compressor is provided.

Based on the detection signal, the switching mechanism opens the closing switching valve.

The compressor sends compressed air to the closing air intake/exhaust ports 626 and 746 with which the cylinder bodies 622 and 732 of the air cylinders 621 and 731 which belong to the rail unit 610 and the diverging rail 700 are provided.

Based on the closing directive signal, the switching mechanism opens the closing switching valve.

When the closing switching valve is opened, the compressor sends compressed air to the closing air intake/exhaust ports 626 and 746 with which the cylinder bodies 622 and 732 of the air cylinders 621 and 731 which belong to the rail unit 610 and the diverging rail 700 are provided.

The compressed air which enters from the closing air intake/exhaust ports 626 and 746 adds pressure to the pistons 623 and 733. By means of this pressure, the pistons 623 and 733 slide.

Since the extension/retraction rod 734 is connected to the guide part 736 and the switching part 615, the guide part 736 is able to move in the direction indicated by the arrow $Z_2$ in FIG. 9(A) in conjunction with the sliding of the piston 733. Furthermore, since the switching rod 624 is connected to the switching part 615 and the piston 623, it is able to move in the direction indicated by the arrow $X_2$ in FIG. 8(A) in conjunction with the sliding of the piston 623. In other words, in conjunction with the sliding of the pistons 623 and 733, the guide part 736 retracts and the switching part 615 extends.

When the guide part 736 retracts, the guide rod 739 moves downward. As a result, it is possible to close the main track 601.

When the switching part 615 extends, the tapered part 617 engages with the main part 611. Accordingly, the main track 601 can be closed. For this reason, the main track 601 does not obstruct the passage of the those garments 100 which pass after this.

Since the distributing operation is carried out based on the bar codes 111, the garment transfer apparatus according to the present preferred embodiment considerably reduces the number of mistakes in destination in comparison with the prior art.

Furthermore, since the speed of transfer of the transfer mechanism can be increased, the garment transfer apparatus according to the present preferred embodiment shortens the time which is necessary for distributing operations in comparison with the prior art.

Furthermore, since in the garment transfer apparatus according to the present preferred embodiment, people do not conduct the distributing operations, at the time of the distribution there is no need for human labor as there is in the prior art. Accordingly, the garment transfer apparatus according to the present preferred embodiment reduces labor costs necessary for distributing operations, and as a result, the operating costs necessary can be reduced in comparison to the prior art.

In addition, the bar codes marked on the tag 110 show the type, cleaning period, price, and so forth of the garment 100 in addition to the target location thereof, and since the computation-processing apparatus 400 is connected to the POS terminal 900, the POS system can be introduced.

Furthermore, the sheet cover 540 provided below the chain 510 allows the lubricant on the chain 510 to be kept from soiling the garments 100.

Next, the effects of the garment transfer apparatus with the construction of the present preferred embodiment will be explained.

Since the garment transfer apparatus according to the present preferred embodiment can reduce the burden on the cleaners of the garments 100 caused by mistakes in destination, it is possible to reduce the operating costs necessary for the cleaning.

As the garment transfer apparatus conducts distributing operations, it allows the speed of distributing operations to be increased in comparison with the case in which distribution is done by human labor.

In addition, since the garment transfer apparatus enables a reduction in the number of people engaged in distributing operations, it makes possible a reduction in the labor costs of cleaning operations. As a result of this, it is possible to reduce the operating costs necessary for cleaning operations.

Furthermore, since the POS system is introduced into the garment transfer apparatus according to the present preferred embodiment, a concentration of management information, such as when, where, or how the garment 100 is to be cleaned, or what quantity of garments 100 are to be cleaned, can be effected.

As a result of the provision of the sheet cover 540 which is provided beneath the chain 510 in the horizontal transfer mechanism, the lubricant and the like of the chain 510 is kept from soiling the garments 100.

What is claimed is:

1. A transfer apparatus comprising:
   a) distribution means for distributing a distributed object, said distributing means including:
      a1) a main rail,
      a2) several diverging rails, and
      a3) a transfer means;
   said main rail having opening and closing means,
   said main rail being arranged for suspending distributed objects,
   said main rail being formed by connected a plurality of rail units in a longitudinal direction;
   said opening and closing means being provided for selectively opening and closing a space between two said rail units at connecting points of said two rail units;
   each of said diverging rails having a hanging portion and extension and retraction means for extending and retracting the hanging portion,
   the diverging rails being provided at a preselected position of the main rail with a preselected space between the main rail and hanging portion, the diverging rails being provided for transferring each distributed object to respective destinations, wherein the hanging distributed object is allowed to fall from an opening formed in the main rail when the main rail is opened by the opening and closing means and the hanging portion of the diverging rail extends into the opening; and
   moving means for moving distributed objects hanging on the main rail, said moving means comprising a chain having hanging parts for engaging the hanging objects, and a motor means for moving the chain;
   b) a bar code providing in association with a distributed object, the bar code indicating at least a destination of the distributed object;
   c) a control means comprising
      a reading means for reading the bar code, sensing means for detecting the passing of a distributed object to send an open signal via a computer to open the opening and closing means, and additional sensing means which sense the passage of distributed objects to send a close signal via a computer to close the opening and closing means, and a computer for processing bar code information for receiving destination information from the reading means and for opening and closing the main rail by detecting said open and close signals from the sensing means, and outputting an open command signal and an extension command signal based on the bar code information and outputting a close command signal and a retraction command signal to the opening and closing means and extension and retraction means so as to open and close the main rail and to lead the distributed object to the diverging rail;

wherein each distributed object is guided to its respective distribution point.

2. A transfer apparatus in accordance with claim 1, wherein each opening and closing means comprises a main body which is on at least the end thereof formed in the shape of a tube, an insert portion which is provided at the other end of the main body which can be inserted into the one end of a rail unit, and actuating means for inserting and withdrawing the insert portion according to the open command signal and the close command signal respectively.

3. A transfer apparatus in accordance with claim 2, wherein each diverging rails comprises:

an actuator for extending the hanging portion in accordance with the extension command signal, and retracting the hanging portion in accordance with the retracting command signal.

4. A transfer apparatus in accordance with claim 1, having waiting means comprising a stopping sensor which senses the passage of the distributed objects, a releasing sensor which senses the passage of a hanging part of distributed objects, a stopping means which stop and releases the distributed object by outputting a stop command signal and release command signal based on the detecting information from the stopping sensor and the releasing sensor to transfer only one distributed object to the main rail at a time.

5. A transfer apparatus in accordance with claim 4 with the main rail having;

an inclined rail section provided at a start point of the main rail, with a lower part end of the inclined rail section being connected to the start point, the stopping sensor being provided proximate to an upper end of the inclined rail section, the releasing sensor being provided proximate to the lower part on of the inclined rail section, and the stopping means being provided between the stopping sensor and the releasing sensor on the inclined rail section.

6. A transfer apparatus in accordance with claim 1 wherein the distributed object is a garment suspended on hangers.

* * * * *